(12) United States Patent
Dudley et al.

(10) Patent No.: US 12,250,535 B2
(45) Date of Patent: Mar. 11, 2025

(54) COMMUNICATIONS SECURITY ARCHITECTURE IMPLEMENTING A SERVICE NEGOTIATION PLANE CHANNEL

(71) Applicant: L3Harris Technologies, Inc., Melbourne, FL (US)

(72) Inventors: Stephen M. Dudley, South Jordan, UT (US); Benjamin C. Dean, Tucson, AZ (US); Charles W. Spittle, West Jordan, UT (US)

(73) Assignee: L3Harris Technologies, Inc., Melbourne, FL (US)

( * ) Notice: Subject to any disclaimer, the term of this patent is extended or adjusted under 35 U.S.C. 154(b) by 555 days.

(21) Appl. No.: 17/505,147

(22) Filed: Oct. 19, 2021

(65) Prior Publication Data

US 2023/0123456 A1 Apr. 20, 2023

(51) Int. Cl.
*H04W 12/00* (2021.01)
*H04W 12/033* (2021.01)
*H04W 12/106* (2021.01)
*H04W 40/02* (2009.01)
*H04W 84/18* (2009.01)

(52) U.S. Cl.
CPC ....... *H04W 12/009* (2019.01); *H04W 12/033* (2021.01); *H04W 12/106* (2021.01); *H04W 40/02* (2013.01); *H04W 84/18* (2013.01)

(58) Field of Classification Search
CPC . H04W 12/106; H04W 12/033; H04W 40/02; H04W 84/18; H04W 88/16; H04W 92/02
See application file for complete search history.

(56) References Cited

U.S. PATENT DOCUMENTS

| 11,783,062 B2 * | 10/2023 | Lounsberry ......... G06F 21/6218 |
| | | 726/30 |
| 2007/0053367 A1 * | 3/2007 | Tyebji .................. H04W 88/16 |
| | | 370/401 |
| 2010/0316029 A1 * | 12/2010 | Kappler ................. H04W 8/12 |
| | | 370/338 |

(Continued)

FOREIGN PATENT DOCUMENTS

WO   WO-2021034906 A1 *   2/2021   ......... H04B 7/18504

OTHER PUBLICATIONS

"IR.34—Guidelines for IPX Provider networks", GSM Association, Version 17.0, May 18, 2021, pp. 58.

(Continued)

*Primary Examiner* — Lizbeth Torres-Diaz
(74) *Attorney, Agent, or Firm* — Fox Rothschild LLP; Carol E. Thorstad-Forsyth

(57) ABSTRACT

A cross-network communication system includes a plurality of client networks. The cross-network communication system includes a Service Negotiation Plane configured to forward messages between the plurality of client networks via a plurality of control interfaces, each of which corresponds to one of the plurality of client networks. Each of the plurality of control interfaces includes a first data guard that belongs to the corresponding client network. The first data guard is configured to prevent exfiltration of classified information or permit only particular types of messages to traverse the Service Negotiation Plane.

20 Claims, 13 Drawing Sheets

(56) References Cited

U.S. PATENT DOCUMENTS

| | | | | |
|---|---|---|---|---|
| 2011/0044304 | A1* | 2/2011 | Connelly | H04W 36/0033 |
| | | | | 370/338 |
| 2015/0382339 | A1* | 12/2015 | Andreoli-Fang | H04W 28/20 |
| | | | | 370/329 |
| 2021/0321303 | A1* | 10/2021 | Nair | H04L 63/0281 |
| 2022/0261487 | A1* | 8/2022 | Lounsberry | G06F 21/6209 |
| 2023/0077026 | A1* | 3/2023 | Bertz | H04L 65/80 |
| 2023/0123456 | A1* | 4/2023 | Dudley | H04W 12/009 |
| | | | | 726/3 |
| 2024/0171980 | A1* | 5/2024 | Manning | H04W 12/37 |

OTHER PUBLICATIONS

2 Gsm Association: "Inter-Operator IP Backbone Security Requirements For Service Providers and Inter-operator IP backbone Providers", Oct. 15, 2007, pp. 19.

3rd Generation Partnership Project; "Technical Specification Group Services and System Aspects; Security Aspects; Study on security aspects of the 5G Service Based Architecture (SBA)", (Release 16), 3GPP TR 33.855 V16.1.0, Sep. 2020, pp. 104.

European Search Report received for EP Patent Application No. 22201819.4, mailed on Feb. 16, 2023, 9 pages.

* cited by examiner

COMMUNICATIONS SECURITY ARCHITECTURE IMPLEMENTING A SERVICE NEGOTIATION PLANE CHANNEL

BACKGROUND

For security purposes, many current networks belong to different security enclaves. When networks of different communication platforms are protected by security enclaves, they need to show that they belong to the same security enclave before any communication can be established.

Traditional approaches for determining whether two mobile networks belong to the same security enclave are based on whether the mobile platforms use the same waveform and/or possess the same encryption key. For example, when a first device in a first mobile network of a first platform tries to communicate with a second device in a second mobile network of a second platform, the first mobile network needs to transmit a request in a particular waveform and/or encrypted by a particular encryption key. The local manager of the second mobile network determines whether the first network is in the same security enclave based on the waveform and/or the encryption key used by the first mobile network. Only when the two mobile networks share the same waveform and/or the same encryption key, may communication between the first device and the second device be established.

However, when multiple networks of different communication platforms belong to different security enclaves, generally, no communication can be established among the multiple networks. In many cases, these networks don't even know, or have no way to find out, whether the other networks exist.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Existing technologies generally do not allow control of a network system across an encryption boundary or a network boundary. The principles described herein provide a mechanism to implement a Service Negotiation Plane, such that service negotiation can take place over a control interface between them.

The embodiments described herein are related to a cross-network communication system, including a plurality of client networks. The cross-network communication system implementing a Service Negotiation Plane configured to facilitate service negotiation between the plurality of networks. In particular, the Service Negotiation Plane is configured to forward messages between the plurality of client networks via a plurality of control interfaces. Each of the plurality of control interfaces is connected to one of the plurality of client networks and includes a data guard (also referred to as "a first data guard) that belongs to the corresponding client network. The first data guard is configured to prevent exfiltration of classified information or permit only particular types of messages to traverse the Service Negotiation Plane.

In some embodiments, each of the control interface further includes a second data guard that belongs to the Service Negotiation Plane. The second data guard is configured to label traffic entering the Service Negotiation Plane or enforce policies relating to which type of messages can be delivered to which client network.

In some embodiments, at least one of the control interfaces further includes a crypto device configured to encrypt or decrypt messages forwarded between the plurality of client networks.

In some embodiments, each of the client networks includes a manager configured to send messages associated with a cross-network service negotiation request directly to the first data guard of a corresponding controller interface. The first data guard allows the messages associated with the cross-network service negotiation request to pass therethrough and reach the Service Negotiation Plane.

In some embodiments, in response to receiving a message associated with a cross-network service negotiation request from a first data controller of a first client network, the Service Negotiation Plane forwards the message to a second controller interface of a second client network. Each of the first network and second network is a client network among the plurality of client networks. In some embodiments, in response to receiving the message, the first data guard of the second controller interface allows the message to pass therethrough and reach the manager of the second network. The manager of the second network then determines whether the cross-network service negotiation request is to be granted or denied. In some embodiments, the manager has access to one or more service rules, and the manager determines whether the cross-network negotiation request is to be granted based on the one or more service rules.

In some embodiments, each of the plurality of networks includes a data plane, a control plane, and a management plane. The Service Negotiation Plane is a layer above the data plane, the control plane, and the management plane of each client network.

In some embodiments, the cross-network communication system further includes a crypto module, such as an End Cryptographic Unit (ECU), implementing the communication security architecture that implements the Service Negotiation Plane.

The ECU includes one or more encryption devices and a trusted switch. The trusted switch is configured to connect to a local platform, including one or more local networks. In response to receiving a request from a manager of a network that is connected to a remote platform over a data link via the Service Negotiation Plane, the trusted switch retrieves one or more service rules associated with the one or more local networks generated by one or more local managers of the one or more local networks.

Based on the one or more service rules, the trusted switch determines whether user data is permitted to be transmitted using any one of the one or more local networks. In response to determining that the user data is permitted to be transmitted using a particular one of the one or more local networks, the trusted switch opens the data plane of the data link, allowing the user data to pass through the data link via the data plane. After receiving the user data from the remote device over the data link via the data plane, the trusted switch then directs the user data to the one or more encryption devices, encrypting the user data by the one or more encryption devices based on one or more path forwarding rules. Finally, the encrypted user data is transmitted to the particular local network of the local platform via the data plane.

In some embodiments, the ECU further includes a multiplexer. Based on the one or more service rules, the trusted switch is configured to direct a plurality of streams of the user data to the multiplexer and direct an output of the multiplexer to be encrypted by one of the one or more encryption devices.

Additional features and advantages will be set forth in the description which follows, and in part will be obvious from the description or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments that are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Existing technologies generally do not allow control of a network system across an encryption boundary or a network boundary. The principles described herein provide a mechanism to logically partition communications between two mobile platforms over a data link into a Service Negotiation Plane and a data plane, such that service negotiation can take place over the data link via the Service Negotiation Plane and secure data transmission can be performed via the data plane.

The embodiments described herein are related to a system implementing a communications security architecture for orchestrating cross-platform communications. The communications security architecture divides communication functions into (1) a Service Negotiation Plane for communications associated with service negotiations; and (2) a data plane for communications associated with transmission of user data.

In some embodiments, the Service Negotiation Plane is a construct similar to that of Data Plane, Control Plane and Management Plane. Each network has its own Data Plane (for user traffic), its own Control Plane (for configuring the network), and its own Management Plane (for making decisions). From network to network these are independent and most often operated by different organizations, so they have their own address and routing rules for the Data Plane, and their own security rules for the network as a whole. The Service Negotiation Plane can be thought of as a layer above the Data Plane, Control Plane, and Management Plane and configured to perform network service negotiation in a way that does not require the address domains, routing domains, and security domains of client networks to be identical.

Figure 1:
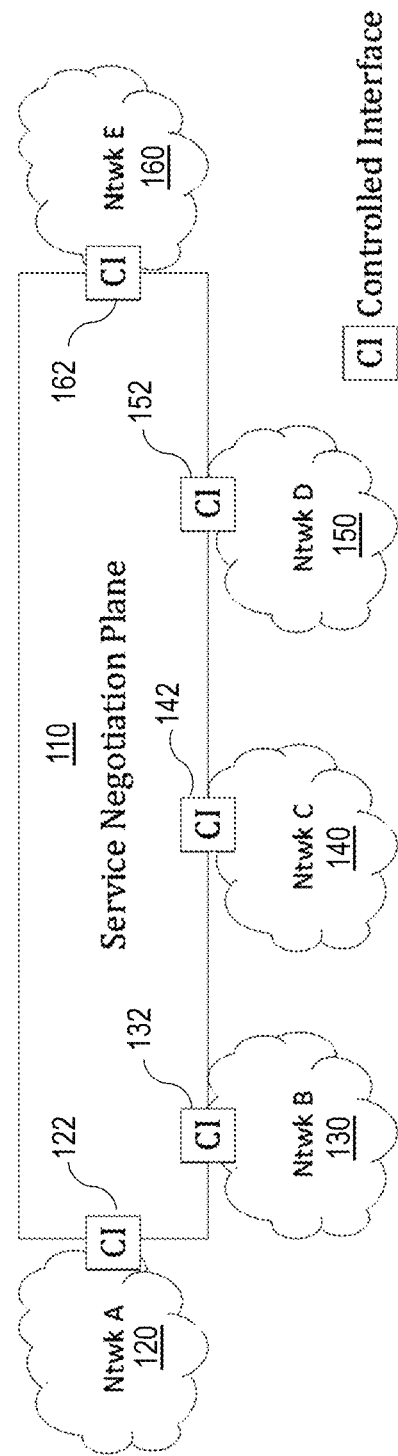
FIG. 1 illustrates an example of a Service Negotiation Plane that has control interfaces with multiple client networks that use the Service Negotiation Plane for service negotiation.

FIG. 1 illustrates an example of a Service Negotiation Plane 110 that has control interfaces (CI) 122, 132, 142, 152, 162 between the Service Negotiation Plane 110 and multiple networks, namely, network A 120, network B 130, network C 140, network D 150, network E 160. Those control interfaces 122, 132, 142, 152, 162 have one or more components that belong to the client networks A-E 120-160 and one or more components that belong to the Service Negotiation Plane 110. The details related to the one or more components that belong to the client networks A-E 120-160 and the one or more components that belong to the Service Negotiation Plane 110 are further described with respect to FIGS. 2A-2C.

Figure 2A:
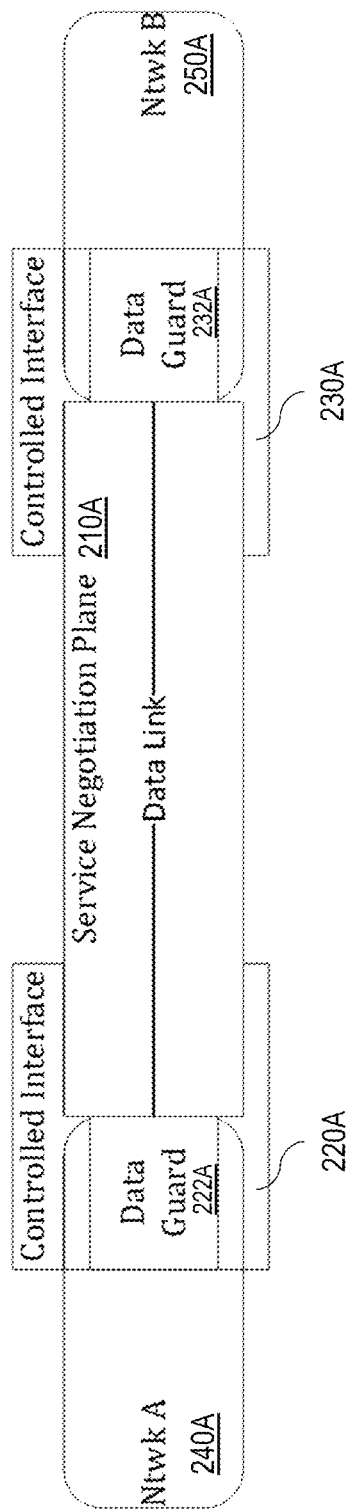
FIG. 2A illustrates an example of a control interface including a data guard implemented by each client network A and B.

FIG. 2A illustrates an example of an embodiment of the Service Negotiation Plane 210A, which corresponds to the Service Negotiation Plane 110 of FIG. 1. The Service Negotiation Plane 210A resides at a data link between a client network A 240A and a client network B 250A. As illustrated, each of the client network A 240A and the client network B 250A includes a data guard 222A, 232A that enforces one or more security rules of that client network A 240A or client network B 250A. In general, the data guard 222A, 232A is configured to prevent the exfiltration of classified information and permit only certain allowed types of messages to traverse the Service Negotiation Plane 210. In some embodiments, the Service Negotiation Plane 210A is configured to perform a message forwarding function between the control interfaces 220A, 230A. Messages carried by the Service Negotiation Plane 210A are service negotiation messages between management entities in different networks (e.g., client network A 240A, and/or client network B 250A) and/or different security domains. The control interfaces 220A, 230A enforce the security policies of the client network and the Service Negotiation Plane 110, including (but not limited to) confidentiality, integrity, and/or availability guarantees. Each control interface 220A, 230A is not connected on the client network to the data forwarding function of that network. Instead, each control interface 220A, 230A is connected (in the respective client network A 240A, or client network B 250A) to one or more managers with decision-making authority that has the ability to control network resources or network behaviors. Such a manager may be (but is not limited to) a security manager, a network manager, a network controller, etc. The one or more managers may have a connection to the data forwarding functions of the network in which it performs management functions, but such native addressing or routing functions of that network are not used to deliver service negotiation messages. The service negotiation messages pass directly from the manager in the client network A 240A and/or client network B 250A to the data guard at the boundary between the client network A 240A, and/or client network B 250A and the Service Negotiation Plane 210A.

In some embodiments, the Service Negotiation Plane 210A has no additional security rules of its own to enforce. In such a case, the control interfaces 220A, 230A will include entirely the data guard 222A, 232A implemented by the client network A 240A, and/or client network B 250A.

Referring back to FIG. 1, in some embodiments, each of the client networks A-E 120-160 has its own security rules to enforce, including (but not limited to) rules about confidentiality of information, integrity of information, and/or availability of messaging services. When there are multiple client networks A-E 120-160 that are connected to a Service Negotiation Plane 110, the Service Negotiation Plane 110 has to concern itself with maintaining its own addressing domain, its own routing domain, and its own security domain, as well as supporting these security rules of its client networks A-E 120-160. In particular, the Service Negotiation Plane 110 cannot compromise the confidentiality of information of those client networks A-E 120-160, the integrity of messaging, or availability of messaging. To achieve this goal, in some embodiments, the Service Negotiation Plane 110 applies its own enforcement functions as part of the control interface 122, 132, 142, 152, 162. As such, several layers of enforcement are possible.

In some embodiments, one layer of enforcement is to label the traffic entering the Service Negotiation Plane 110 and enforce policies relating to which traffic can be delivered to which client networks through a Label Edge Data Guard (LEDG). In some embodiments, another layer of enforcement is to implement encryption to mitigate the problem of mis-delivered messages that the LEDG somehow fails to filter out.

Figure 2B:
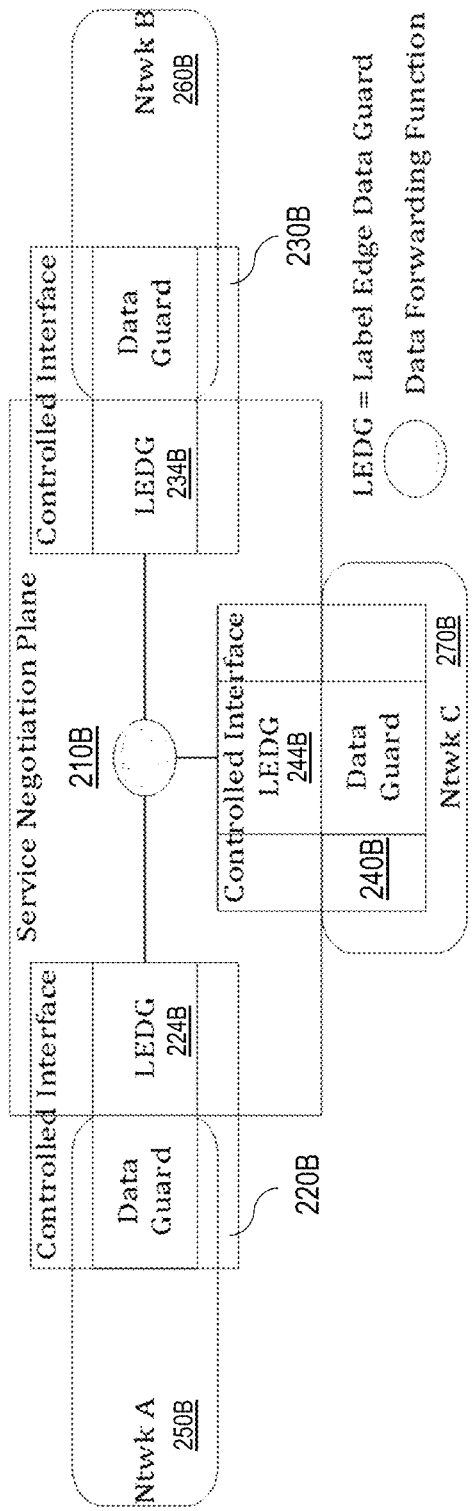
FIG. 2B illustrates an example of Service Negotiation Plane side of a control interface that implements a label edge data guard to enforce security policies relating to what traffic may be received by which networks.

FIG. 2B illustrates an example of a Service Negotiation Plane 210B having control interfaces 220B, 230B, 240B, each of which includes an LEDG 224B, 234B, 244B on the side of the Service Negotiation Plane 210B to enforce security policies relating to what traffic may be received by which networks (e.g., network A 250B, network B 260B, and/or network C 270B). For example, network A 250B and network B 260B may be classified networks and network C 270B may be an unclassified backbone network intended to provide transport services. The Service Negotiation Plane 210B may be configured to enforce a rule, which allows network A 250B to exchange service negotiation messages with network C 270B, but not with network B 260B.

Figure 2C:
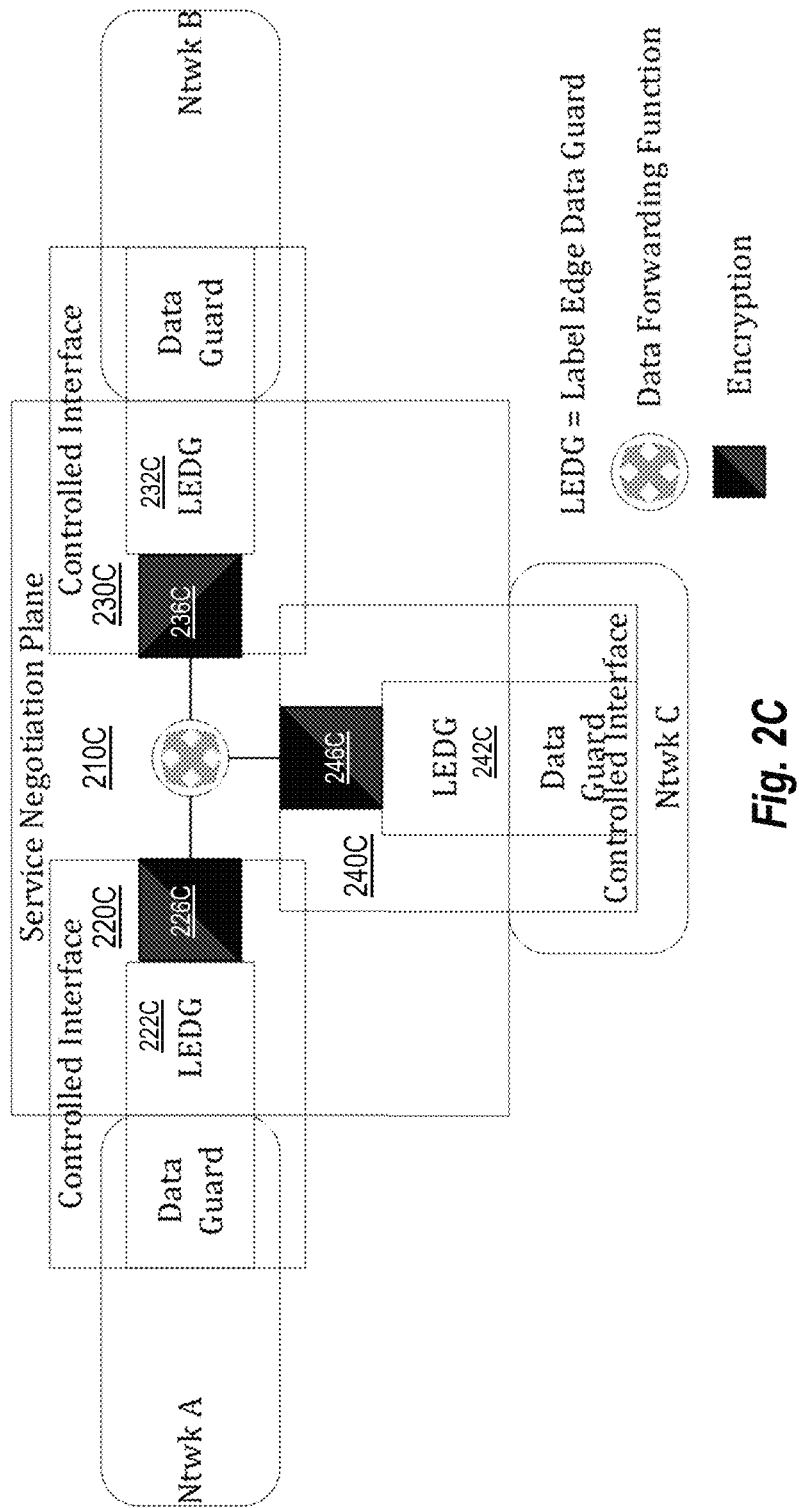
FIG. 2C illustrates an example of a Service Negotiation Plane side of a control interface that includes encryption to provide additional guarantees of message confidentiality across the Service Negotiation Plane.

FIG. 2C illustrates another example of Service Negotiation Plane 210C having control interfaces 220C, 230C, 240C, each of which includes an LEDG 222C, 232C, 242C and a crypto device 226C, 236C, 246C on the side of the Service Negotiation Plane 210C to not only enforce security policies, but also perform encryption.

Figure 3:
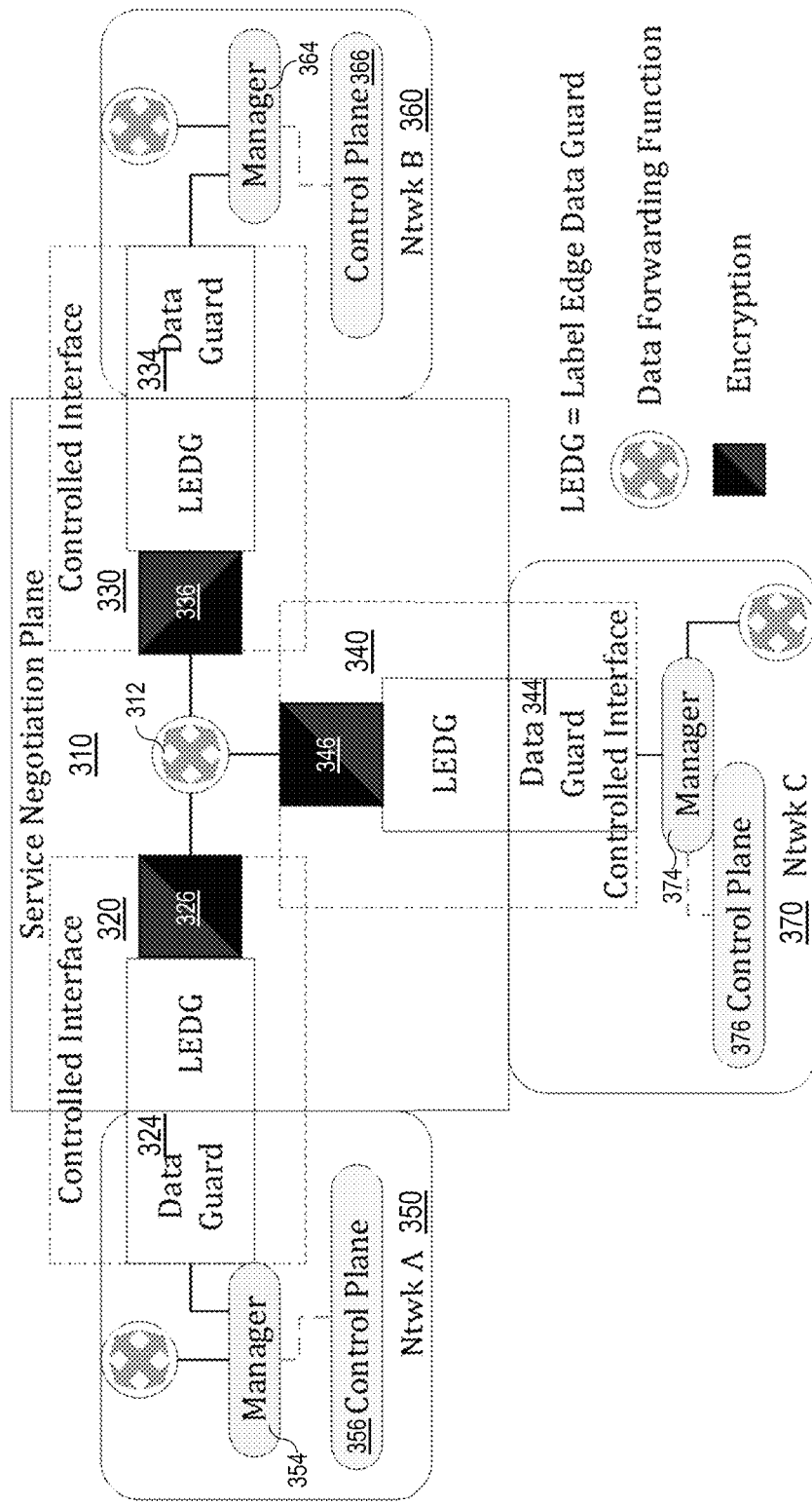
FIG. 3 illustrates an example of a Service Negotiation Plane side of a control interface that includes encryption, through which service negotiation messages are exchanged between managers within client networks.

FIG. 3 illustrates another example of Service Negotiation Plane 310, in which service negotiation messages are exchanged between managers 354, 364, 374 within client network A 350, network B 360, and/or network C 370. As illustrated in FIG. 3, each network A 350, network B 360, or network C 370 includes a manager 354, 364, 374. The manager 354, 364, 374 may be (but is not limited to) a security manager, a network manager, and/or a network controller. The manager 354, 364, 374 is connected to a control plane 356, 366, 376 with decision-making authority. The control plane of each network A 350, network B 360, network C 370 has the ability to control its own network resources or its own network behaviors, including data forwarding functions 312. However, such native addressing or routing functions of each network are not used to deliver service negotiation messages. The service negotiation messages pass directly from each manager 354, 364, 374 in the client network A 350, network B 360, or network C 370 to the corresponding data guard 324, 334, 344 at the boundary (i.e., control interface 320, 330, or 340) among the client network A 350, network B 360, and/or network C 370 and the Service Negotiation Plane 310. The Service Negotiation Plane 310 then performs a message forwarding function among the control interfaces 320, 330, 340.

The nature of messages between managers 354, 364, 374 is such that almost all messages need to be delivered plain-text to the control interface 320, 330, 340 with the Service Negotiation Plane 310. In cases where networks of different security classification use the same Service Negotiation Plane 310, their data planes cannot be connected plain-text because of the need to preserve confidentiality of classified information. In such a case, there will be a crypto device (e.g., crypto device 326) that encrypts traffic that must pass from one network (e.g., network A 350) to the other (e.g., network B 360) in order to receive transport services across the other network (e.g., network B 360). At a remote location on the other network, another crypto device (e.g., crypto device 336) will connect to a network (e.g., network B 360) of the same classification as the first. That crypto device (e.g., crypto device 336) will decrypt message so the information can be delivered plain text to destinations on that network (e.g., network B 360).

In like manner, in some embodiments, a Service Negotiation Plane 310 existing on one platform can be extended to another platform by using a crypto device 326, 336, 346 to insert encrypted Service Negotiation Plane traffic onto another network and deliver it to a Service Negotiation Plane 310 on that other platform. In such a case, the Service Negotiation Plane is a composite of Service negotiation Planes on all platforms as opposed to remaining independent logical entities. The addressing rules, routing rules, and security rules are the same as opposed to being independent and requiring a gateway between them the different platforms. This behavior of the Service Negotiation Plane allows for the creation of a management network that spans networks of multiple security classifications and allows service negotiation between them. In particular, where there exists one or more unclassified backbone networks that provide transport services for various classified networks, the entire system can be managed through a single Service Negotiation Plane.

Figure 4:
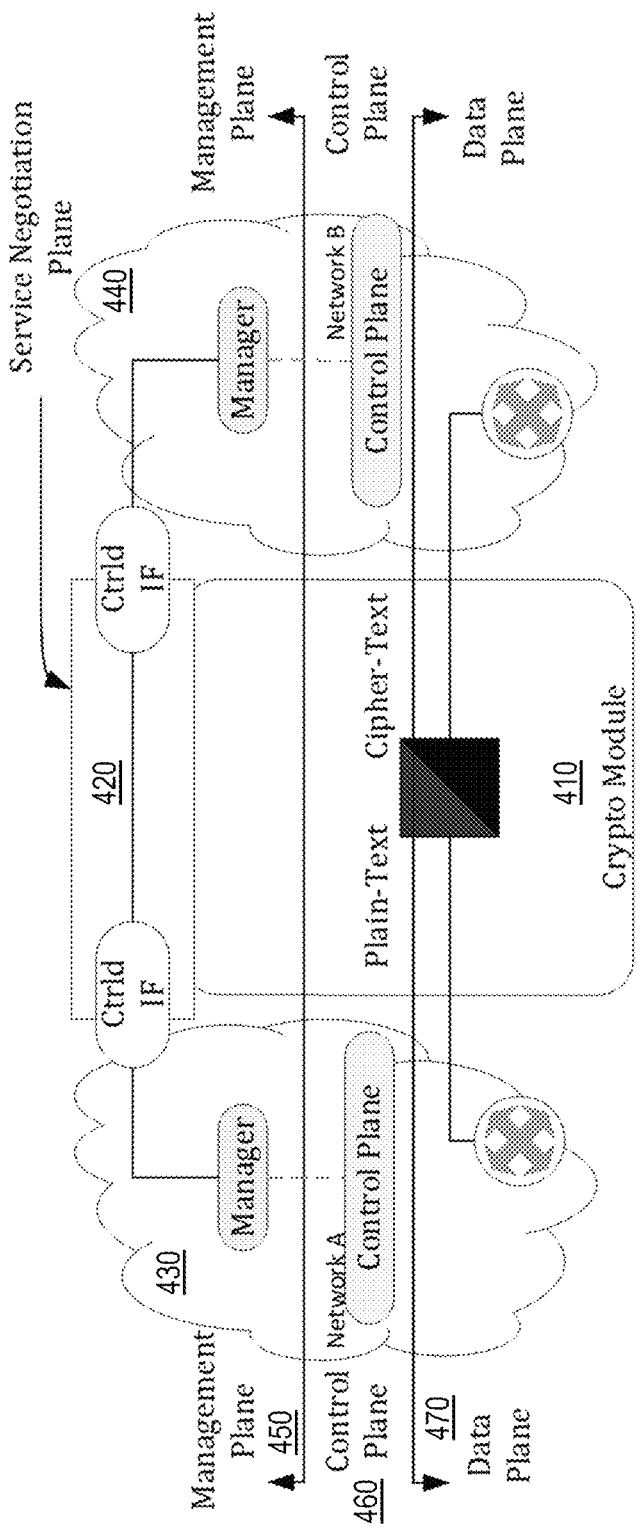
FIG. 4 illustrates an example of a Service Negotiation Plane that is a layer above the data plane, control plane, and management plane of individual networks that provides inter-network service negotiation.

As briefly mentioned above, the Service Negotiation Plane can be thought of as a layer above the Data Plane, Control Plane, and Management Plane and configured to perform network service negotiation in a way that does not require the address domains, routing domains, and security domains of client networks to be identical. FIG. 4 illustrates an example of a Service Negotiation Plane 420 that is a layer above the Data Plane 470, Control Plane 460, and Management Plane 450 of individual networks (e.g., network A 430 and network B 440) that provides inter-network service negotiation. In some embodiments, the Service Negotiation Plane 420 is always open for communications associated with service negotiations, while the data plane 470 is closed to block user data from a remote platform unless a service negotiation is successful. In some embodiments, the Service Negotiation Plane 420 is implemented at a crypto module 410.

Figure 5A:
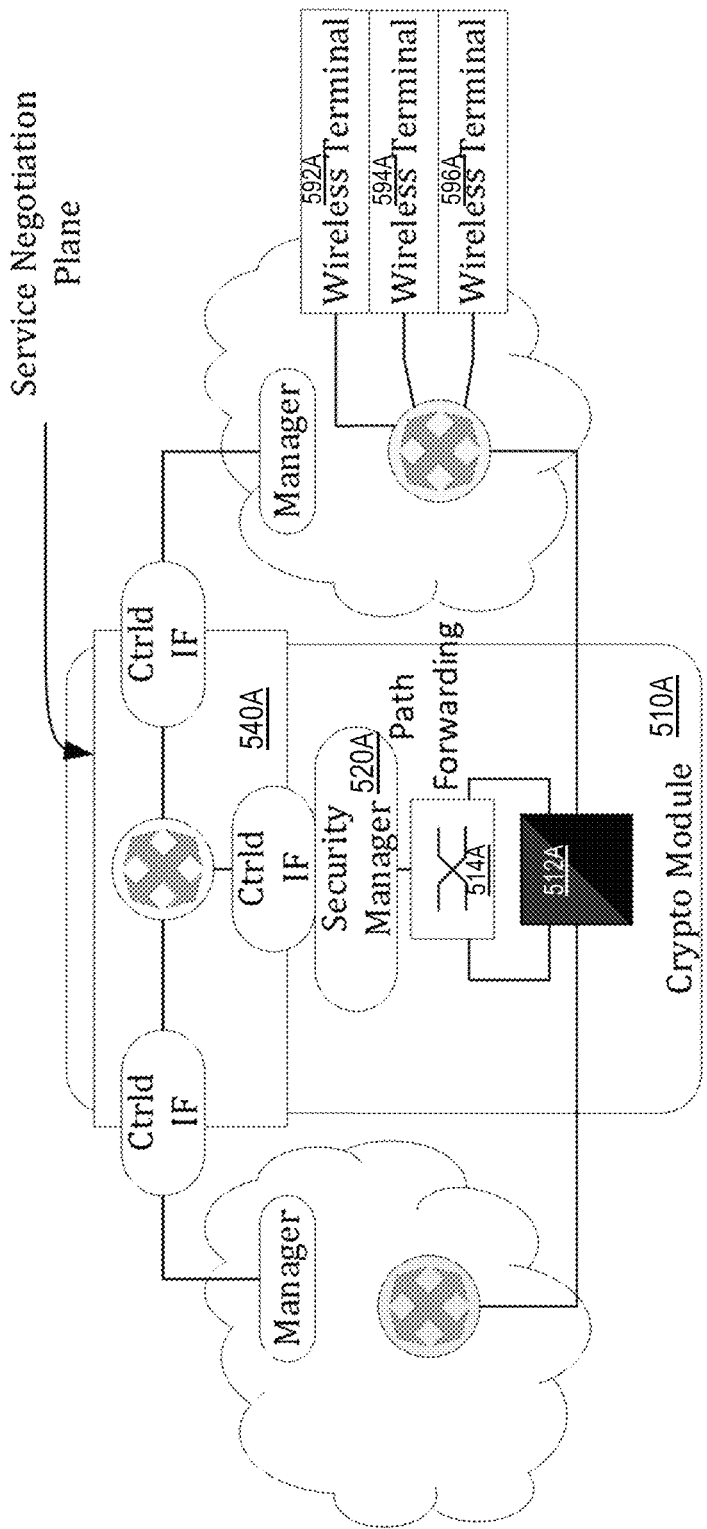
FIG. 5A illustrates an example of path forwarding and security manager within a crypto module.

FIG. 5A further illustrates an example of using a crypto module 510A to implement a Service Negotiation Plane 540A and to perform path forwarding and security management. As illustrated in FIG. 5A, the crypto module 510A includes a security manager 520A that has control over a path forwarding function. The embodiment allows multiple passes through the encryption function 512A. In some embodiments, the Service Negotiation Plane 540A permits multiple layers of encapsulation to be created where the outer encryption layers are added first, or removed first, which permits a single crypto device to replace two or more crypto devices. For example, the traffic may have been first encrypted by the end application, and then encrypted by the network at some point along its path, and then encrypted for over-the-air transmission. As such, three layers of encryption are performed. For a mobile node 592A, 594A, 596A to house three separate encryption devices could create size, weight, and power issues. As noted in FIG. 5A, these encryption devices could be either block encryption or stream encryption, so there may be a path forwarding function 514A between multiple crypto devices with different characteristics within the same crypto module 510A.

Figure 5B:
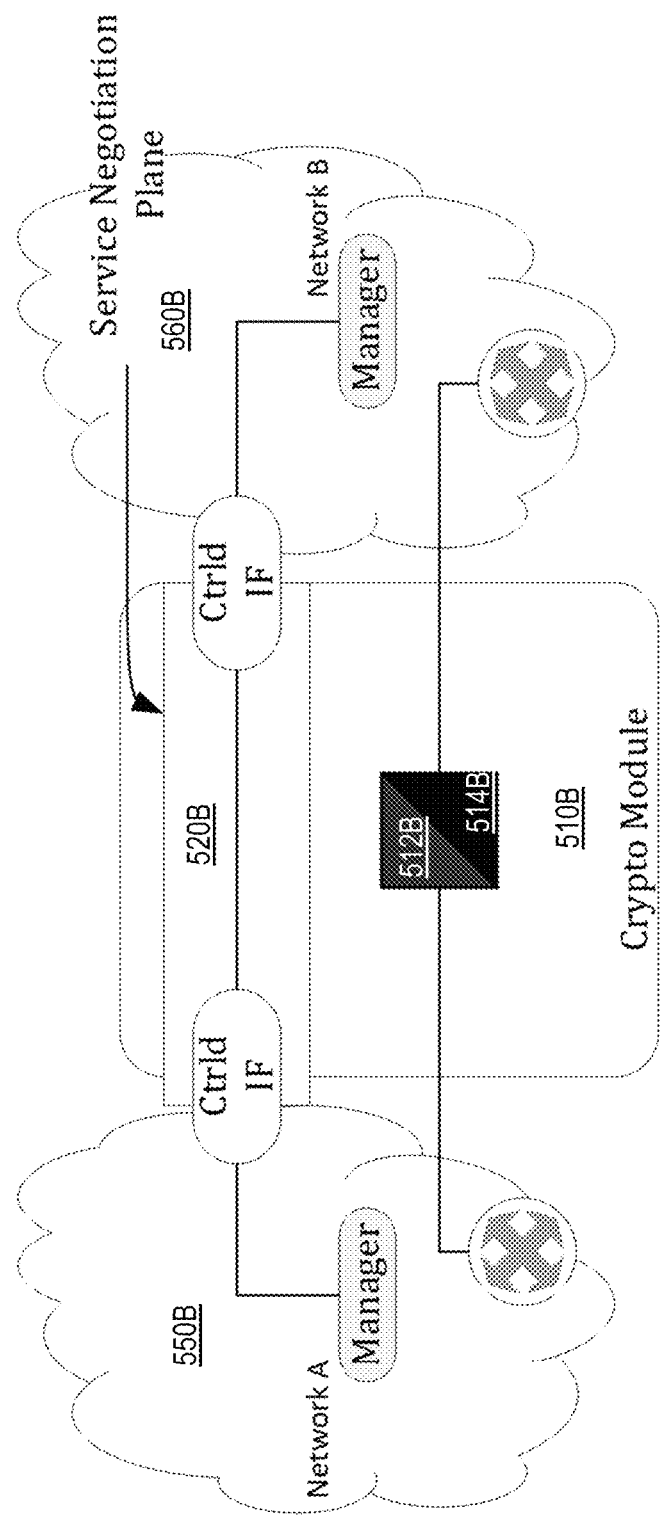
FIG. 5B illustrates an example of a simple case of Service Negotiation Plane.

FIG. 5B illustrates a simple case of a Service Negotiation Plane 520B where service negotiation messages are conveyed between a plain-text network (e.g., network A 550B on plain side 512B) a ciphertext network (e.g., network B 560B on cipher side 514B). In this case, the services are not necessarily related to path forwarding. Instead, the services may include a discovery service. The network (e.g., network B 560B) on the cipher side 514B of the encryption device may be connected through its data links to a large number of other nodes, and some of these nodes may have other networks on their cipher side 514B, perhaps even members of the same ciphertext network in the example. The cipher side 514B network in this example could query the plain side network (e.g., network A 550B) as to a name by which it wished to be discovered. Alternatively, the plain side network (e.g., 550B) could request a registration service from the cipher side network and register its name with that service on the cipher side network 514B. In either case, the cipher side network could then offer a discovery service to plain side networks connected to it. Other plain side networks could then query the cipher side network discovery service to discover whether a compatible network was reachable through the cipher side network and even ask the cipher side 514B network to provide communications as a Service (CaaS) with a particular Quality of Service to reach the 560B network. The cipher side network (e.g., network A 514B) could agree to those terms, negotiate other terms, or deny service over the Service Negotiation Plane 520B. The two connecting plain side networks can also use the Service Negotiation Plane 520B to agree to establish communications, and instruct their Data Plane controlled interface with the cipher side network (e.g. Data Plane Crypto) to enforce that decision, perhaps accepting the connection, or denying the connection even if the corresponding plain side network has the correct encryption algorithms and keys to otherwise establish connectivity across the cipher-side network.

Figure 5C:
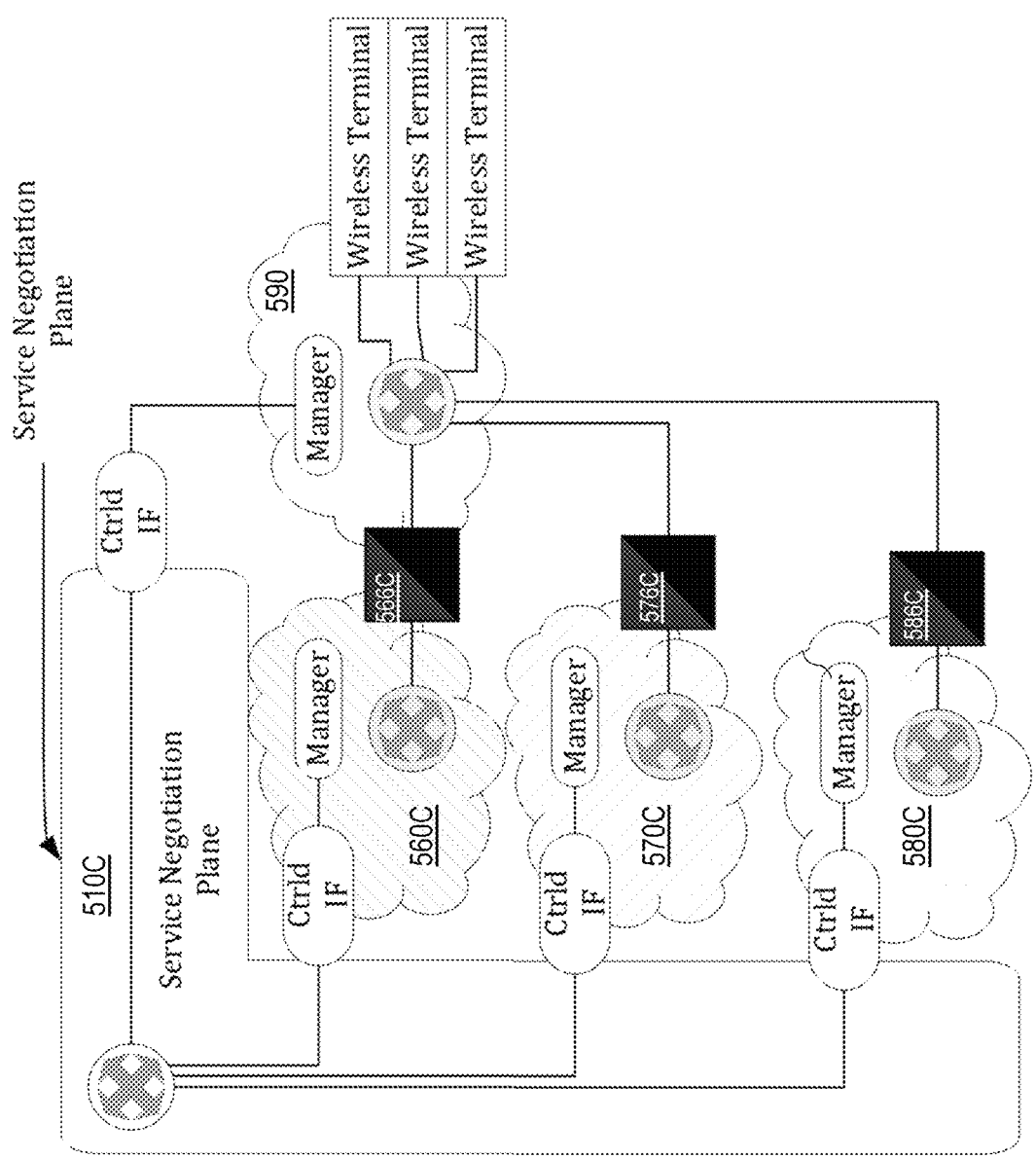
FIG. 5C illustrates an example of service negotiation for platforms supporting multiple security enclaves and an encrypted backbone network.

In some embodiments, a Service Negotiation Plane 510B is used to allow service negotiation via networks (e.g., networks 560C, 570C, 580C) of different security enclaves. FIG. 5C illustrates an example of service negotiation plane 510C that supports networks 560C, 570C, 580C in three different security enclaves, each with their own crypto device (e.g., 566C, 576C, 586C) to connect to a backbone network (e.g., network 590). As with the example given earlier, each of these networks 560C, 570C, 580C (that belong to different security enclaves) could independently negotiate services with the crypto side network 590. As illustrated, the crypto side network 590 controls data link resources that can be allocated to one or more networks 560C, 570C, 580C that belong to different security enclaves.

Figure 5D:
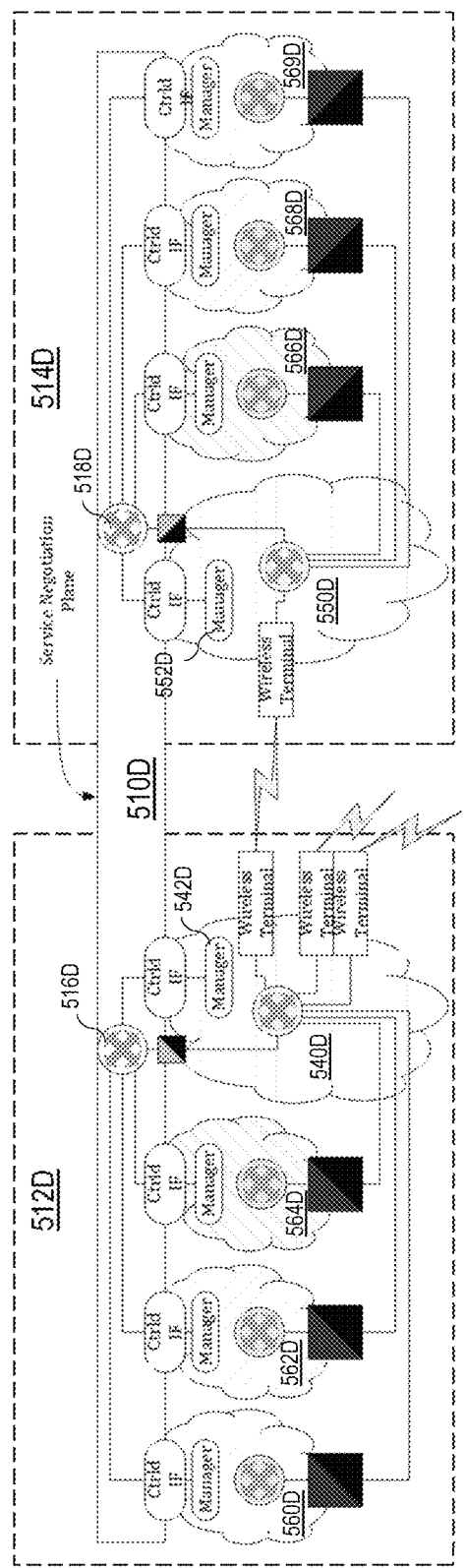
FIG. 5D illustrates an example of creating a Service Negotiation network.

In some embodiments, a Service Negotiation Plane is used to allow service negotiation over an encrypted backbone. FIG. 5D illustrates an example of an embodiment, in which two platforms 512D, 514D form a Service Negotiation Plane 510D over an encrypted backbone network 540D, 550D. Although the example shows only two nodes 516D and 518D, the number of nodes that can be included in such a network is limited only by the number of the backbone networks 540D, 550D. In this case, not only can each network 560D, 562D, 564D in different security enclaves negotiates services with the cipher side backbone network (e.g., networks 540D, 550D), it can also negotiate services with other members of its own network. Those messages are transported in an encrypted overlay network that uses the backbone network 540D, 550D as its transport mechanism. Further, a management entity (e.g., managers 542D, 552D) on the cipher side network (e.g., network 540D, 550D) can now negotiate service with any other client networks (e.g., networks 560D, 562D, 564D, 566D, 568D, 569D), regardless of their security classification. The embodiment allows explicitly manage the resources of the cipher side network to enhance the performance of the overall system (e.g., who gets access to throughput).

Further, the principles described herein also include implementing architectural accommodations to communication security devices that provide encryption services for data links, such as an End Cryptographic Unit (ECU). The architecture accommodations include implementing a communication security architecture at an ECU that divides communication functions into (1) a Service Negotiation Plane for communications associated with service negotiations and (2) a data plane for communications associated with transmission of user data. The architecture accommodations also allow communication among multiple encryption devices, each with a potentially different type of encryption (e.g., block encryption versus stream encryption) and different encryption algorithms.

Figure 6:
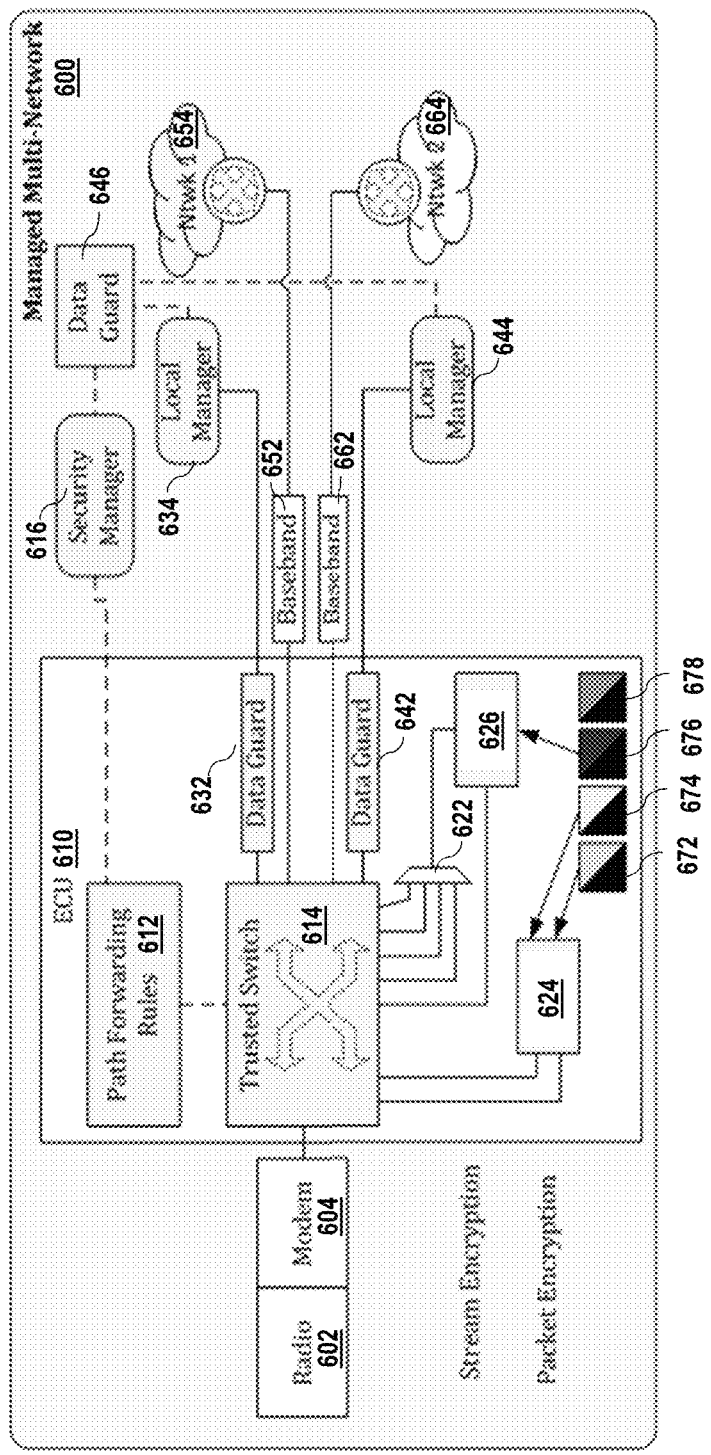
FIG. 6 illustrates an example of an End Cryptographic Unit implementing the principles described herein.

FIG. 6 illustrates an example of an ECU 610 that includes architectural accommodations that divide cross-platform communication functions into a Service Negotiation Plane and a data plane. The ECU 610 is connected to a modem 604, which connects to a radio 602. The radio 602 may be a Software Defined Radio that is capable of supporting multiple waveforms and/or multiple waveform behaviors, such as (but not limited to) optical Low Probability of Intercept/Low Probability of Detection (LPI/FLPD) features. The radio 602 is configured to communicate with remote devices via the Service Negotiation Plane and the data plane.

The ECU 610 includes one or more encryption devices 624, 626, and a trusted switch 614. As illustrated, one encryption device 626 is a stream encryption device, and another encryption device 624 is a block encryption device. The trusted switch 614 is connected to multiple ports. Two of the multiple ports directly support local networks 654 and 664 in a local platform 600. These ports are shown as passing through a baseband block 652, 662 to match any data link layer or network layer accommodations needed specifically for those networks 654, 664. The data link layer and network layer include features such as Network Address Translation or message translation. The other two of the multiple ports are connected to the local managers 634, 644 of the local networks 654, 664 via data guards 632 and 642.

The ECU 610 also has a port connected to a security manager 616 that manages the ECU 610's configuration. In particular, the security manager 616 is configured to establish one or more service rules 612 of the trusted switch 614. The trusted switch 614 is configured to direct traffic to one of the encryption devices 624 and 626. The inputs and outputs of both encryption devices 624 and 626 are fed into the trusted switch 614. The direction of traffic includes (but is not limited to) directing an output of one encryption device to an input of another encryption device, and/or directing an output of one encryption device to an input of the same device to apply (or remove) multiple layers of encryption.

The ECU 610 also includes a multiplexer 622. The multiplexer is configured to aggregate multiple encryption streams and to deliver the multiple streams to multiple independent remote interfaces. The blocks 672, 674, 676, and 678 with black triangles represent different encryption streams (perhaps with a same or different algorithms and/or with different encryption keys).

In response to receiving a request from a remote device that is connected to a remote platform over a data link (between the modem 604 and a remote device (not shown)) via the Service Negotiation Plane, the trusted switch 614 retrieves one or more service rules 612 associated with the one or more local networks 654, 664.

Based on the one or more pass forwarding rules 612, the trusted switch 614 determines whether the user data is permitted to be transmitted using any one of the local networks 654, 664. In response to determining that the user data from the remote device is permitted to be transmitted using a particular one of the local networks 654, 664, the trusted switch 614 opens the data plane of the data link, allowing the user data to pass through the data link via the data plane. After receiving the user data from the remote device over the data link via the data plane, the trusted switch 614 then directs the user data to the one or more encryption devices 624, 626, causing the user data to be encrypted by the one or more encryption devices 624, 626 based on the one or more service rules 612. Finally, the encrypted user data is transmitted to the particular local network 654 or 664 of the local platform 600 via the data plane.

In some cases, the remote network (not shown), similar to each local network 654, 664, also has a remote manager. The principles described herein allow the remote manager and the local managers 634, 644 to communicate with each other and negotiate services via the orchestrator and/or the ECU 610. In embodiments, the remote manager to the local manager 634 or 644 messaging is facilitated by a channel that supports the Service Negotiation Plane. Traffic coming from a remote platform over the Service Negotiation Plane must first pass through a data guard 632, 642 before it can reach the local manager 634 or 644. When a local manager 634 or 644 wishes to make a change to the ECU 610, such as to allow the data plane connection, the local manager 634 or 644 communicates with the security manager 616 also through a data guard 646.

The following discussion now refers to a number of methods and method acts that may be performed. Although the method acts may be discussed in a certain order or illustrated in a flow chart as occurring in a particular order, no particular ordering is required unless specifically stated or required because an act is dependent on another act being completed prior to the act being performed.

Figure 7:
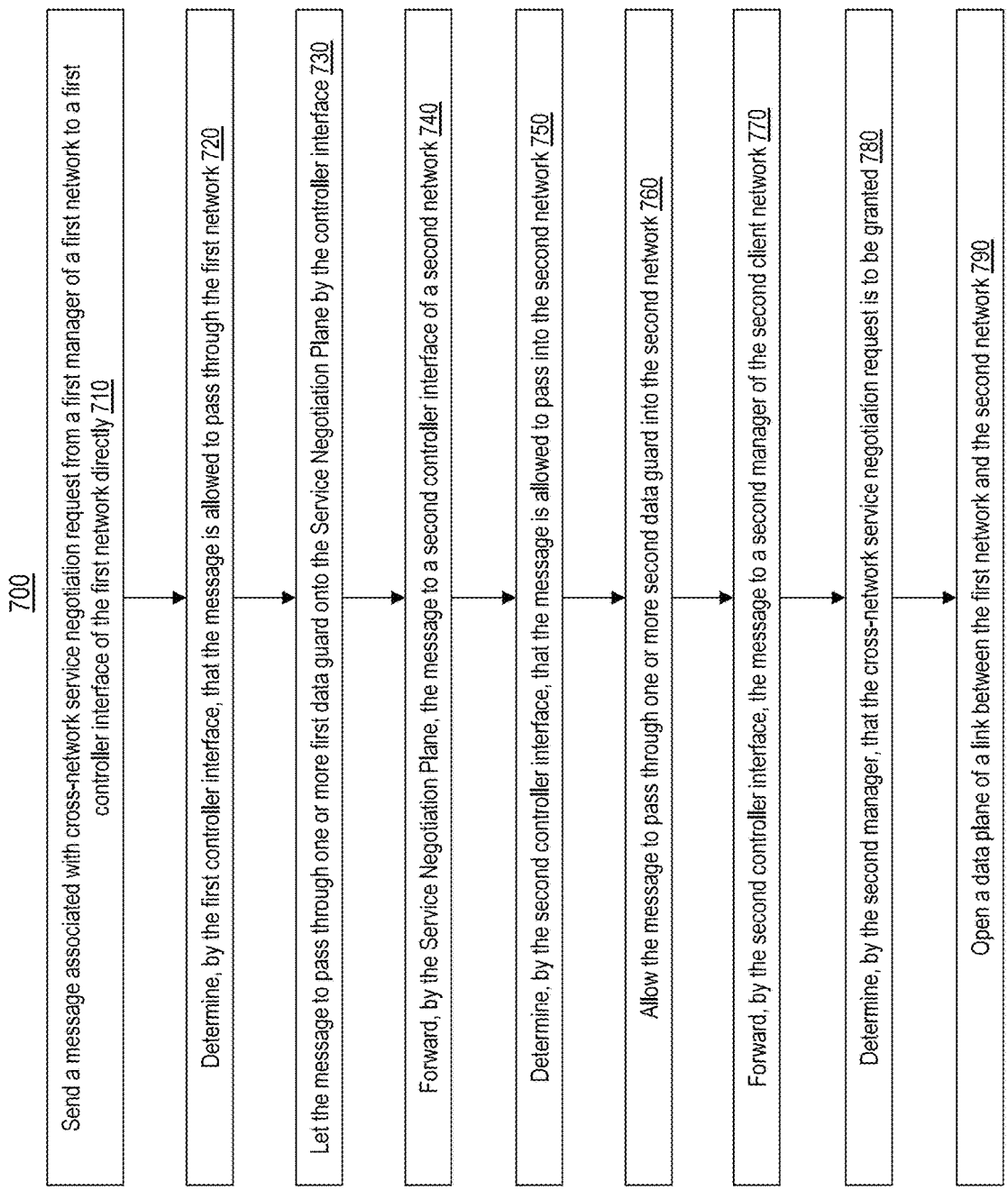
FIG. 7 illustrates a flowchart of an example of a method for negotiating communication services among networks in different platforms.

FIG. 7 illustrates a flowchart of an example of a method 700 for negotiating communication services among networks in different platforms. The method 700 may be implemented at the ECU 610 of FIG. 6 that implementing a communication security architecture that divides communication functions into a Service Negotiation Plane and a data plane.

The method 700 includes sending a message associated with a cross-network service negotiation request from a first manager of a first network to a first controller interface of the first network directly (act 710). The first network is one of a plurality of networks that implements a Service Negotiation Plane. The method 700 further includes determining, by the first controller interface, that the message is allowed to pass through the first network (act 720) and letting the message pass through a first data guard onto the Service Negotiation Plane (act 730). The method 700 further includes forwarding, by the Service Negotiation Plane, the message to a second controller interface of a second network (act 740). The second network is also one of the plurality of networks that implements the Service Negotiation Plane. Receiving the message, the second controller interface then determines that the message is allowed to pass into the second network (act 750) and allowing the message to pass through a second data guard into the second network (act 760). The second controller interface then forwards the message to a second manager of the second client network (act 770). The second manager then determines whether the cross-network negotiation request is to be granted (act 780). If the cross-network negotiation request is to be granted, a data plane of a link between the first network and the second network is opened (act 790). Note that the network may in some embodiments, be mobile ad hoc networks.

Finally, because the principles described herein may be performed in the context of a computing system, for example, each of the controller interfaces, managers, local managers, security managers, and the ECU 610 may be a computing system or implemented at a computing system, some introductory discussion of a computing system will be described with respect to FIG. 8.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
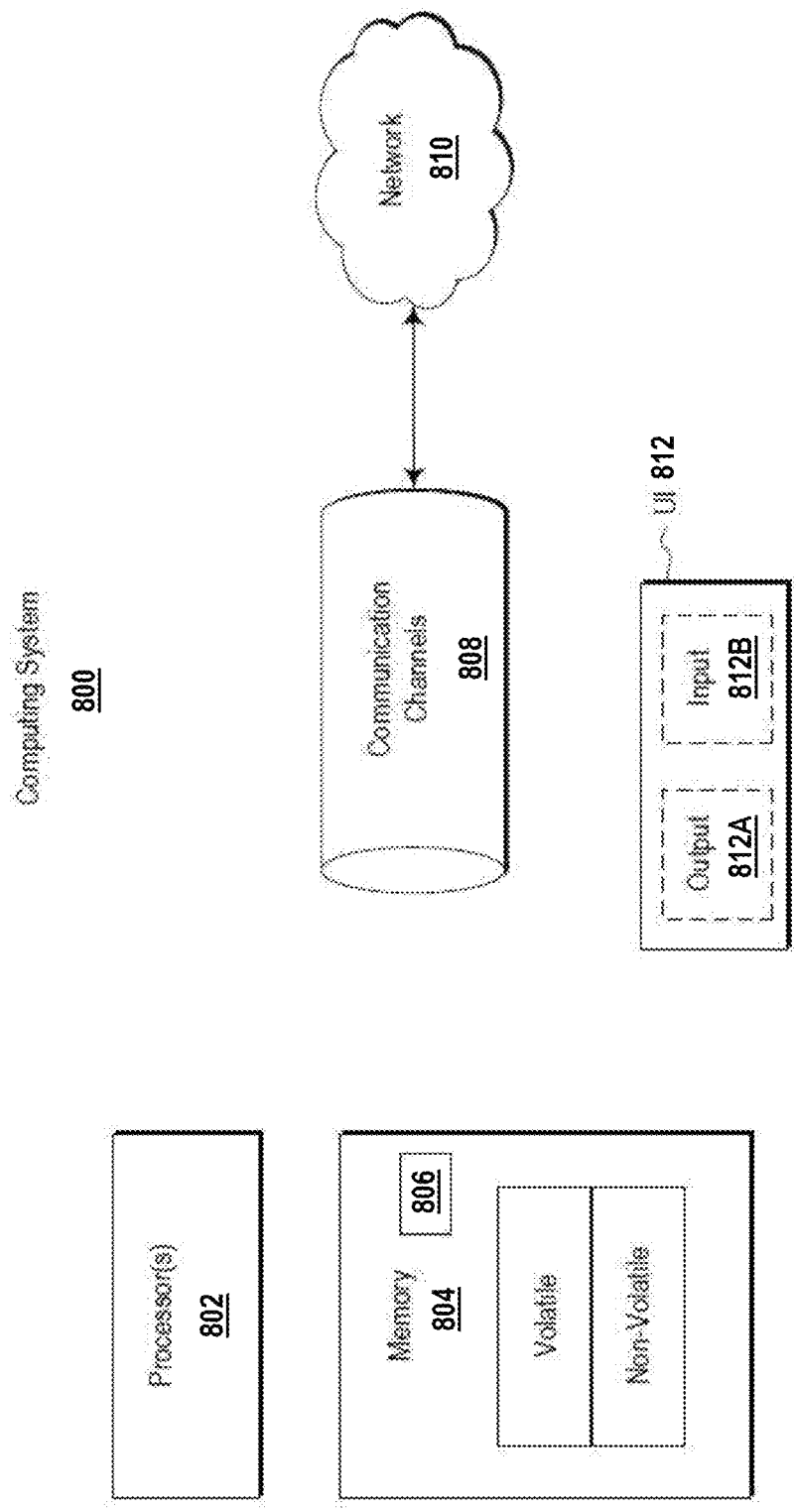
FIG. 8 illustrates an example of a computing system in which the principles described herein may be employed.

As illustrated in FIG. 8, in its most basic configuration, a computing system 800 typically includes at least one hardware processing unit 802 and memory 804. The processing unit 802 may include a general-purpose processor and may also include a field-programmable gate array (FPGA), an application-specific integrated circuit (ASIC), or any other specialized circuit. The memory 804 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 800 also has thereon multiple structures often referred to as an "executable component." For instance, memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component."

The term "executable component" is also well understood by one of ordinary skill as including structures, such as hardcoded or hardwired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component," "agent," "manager," "service," "engine," "module," "virtual machine," or the like may also be used. As used in this description and in the case, these terms (whether expressed with or without a modifying clause) are also intended to be synonymous with the term "executable component" and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hardwired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, holograms, and so forth. Examples of input mechanisms 812B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems that may correspond to the computing system 800 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 802 and memory 804, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cross-network communication system comprising:
    a plurality of client networks and a crypto module implementing a Service Negotiation Plane configured to facilitate service negotiation between the plurality of client networks;
    the Service Negotiation Plane is configured to forward messages between the plurality of client networks via a plurality of control interfaces, each of the plurality of control interfaces being connected to one of the plurality of client networks,
    each of the plurality of control interfaces includes a first data guard that belongs to a corresponding client network, the first data guard being configured to prevent exfiltration of classified information, wherein
        each of the client networks includes a manager configured to send messages associated with a cross-network service negotiation request directly to the first data guard of a corresponding controller interface,
        the first data guard allows the messages associated with the cross-network service negotiation request to pass through and reach the Service Negotiation Plane,
        in response to receiving a message associated with a cross-network service negotiation request from a first data controller of a first client network among the plurality of client networks, the Service Negotiation Plane forwards the message to a second controller interface of a second client network among the plurality of client networks,
in response to receiving the message associated with a cross-network service negotiation request, the first data guard of the second controller interface allows the message to pass therethrough and reach the manager of the second client network,
the manager of the second client network determines whether the cross-network service negotiation request is to be granted or denied,
the crypto module further comprising:
one or more crypto devices configured to encrypt or decrypt messages,
a security manager that controls a path forwarding function implemented by the crypto module and configured to encapsulate messages via the one or more crypto devices and configured to encapsulate messages via the one or more crypto devices in a particular order; and
a trusted switch configured to:
(1) direct an output of one crypto device from among the one or more crypto devices to an input of another crypto device from among the one or more crypto devices based on one or more service rules, the one or more service rules used to determine whether user data is permitted to be transmitted using any one of the one or more client networks,
(2) direct an output of one crypto device from among the or more crypto devices to an input of a same crypto device based on the one or more service rules, or
(3) a combination thereof.

2. The cross-network communication system of claim 1, wherein each of the plurality of control interfaces further includes a second data guard that belongs to the Service Negotiation Plane, the second data guard being configured to label traffic entering the Service Negotiation Plane or enforce policies relating to which type of messages can be delivered to which client network.

3. The cross-network communication system of claim 1, wherein at least one of the control interfaces further includes a crypto device from among the one or more crypto devices configured to encrypt or decrypt messages forwarded between the plurality of client networks.

4. The cross-network communication system of claim 1, wherein the manager has access to the one or more service rules, and the manager determines whether the cross-network service negotiation request is to be granted based on the one or more service rules.

5. The cross-network communication system of claim 4, wherein each of the plurality of client networks includes a data plane, a control plane, and a management plane, and
the Service Negotiation Plane is a layer above the data plane, the control plane, and the management plane of each client network.

6. The cross-network communication system of claim 1, the system further comprising a multiplexer,
wherein based on the one or more service rules, the trusted switch is further configured to:
direct a plurality of streams of user data to the multiplexer; and
direct an output of the multiplexer to be encrypted by at least one of the one or more encryption devices.

7. The cross-network communication system of claim 6, wherein the one or more encryption devices include a first encryption device configured to perform a first type of encryption, and a second encryption device configured to perform a second type of encryption; and
wherein the one or more service rules include a rule directing the user data to be encrypted using (1) the first type of encryption, (2) the second type of encryption, or (3) a combination thereof.

8. The cross-network communication system of claim 7, wherein the first encryption device is configured to perform stream encryption, and the second encryption device is configured to perform block encryption.

9. The cross-network communication system of claim 1, wherein the plurality of networks includes one or more first networks in a first platform and one or more second networks in second platform; and
wherein each of the one or more first networks and the one or more second networks is a mobile ad hoc network.

10. An End Encryption Unit (ECU) implementing a communication security architecture that divides communication functions into (1) a Service Negotiation Plane for communications associated with service negotiations and (2) a data plane for communications associated with transmission of user data, wherein the Service Negotiation Plane is always open for communications associated with service negotiations, while the data plane is closed to block any user data from a remote platform unless a service negotiation is successful, the ECU comprising:
one or more encryption devices; and
a trusted switch configured to:
connect to a local platform including one or more local networks;
receive a request from a remote device that is connected to a remote platform including one or more remote networks over a data link via the Service Negotiation Plane, the request being a request for transmitting user data using one of the one or more local networks;
retrieve one or more service rules associated with the one or more local networks generated by one or more local managers of the one or more local networks, wherein each of the one or more local networks has a local manager configured to (1) manage a plurality of communication functions of a corresponding local network among the one or more local networks and (2) establish one or more service rules associated with the corresponding local network;
based on the one or more service rules, determine whether the user data is permitted to be transmitted using any one of the one or more local networks of the local platform; and
in response to determining that the user data from the remote device is permitted to be transmitted using a particular one of the one or more local networks,
open the data plane of the data link, allowing the user data to pass through the data link via the data plane;
receive the user data from the remote device over the data link via the data plane;
direct the user data to the one or more encryption devices, encrypting the user data by the one or more encryption devices based on the one or more service rules; and
transmit the encrypted user data to a particular local network of the local platform via the data plane.

11. The ECU of claim 10, wherein determining whether the user data is permitted to be transmitted using any one of the one or more local networks of the local platform comprises causing a data guard that belongs to one of the local networks to determine whether a message is a particular type of message that is allowed to pass through.

12. The ECU of claim 10, the trusted switch configured to cause a data guard that belongs to the Service Negotiation Plane to label a message as a service negotiation message.

13. The ECU of claim 10, the trusted switch configured to cause a data guard that belongs to the Service Negotiation Plane to label a message as a message that can be delivered to one of the one or more local networks.

14. The ECU of claim 10, wherein directing the user data to the one or more encryption devices, encrypting the user data by the one or more encryption device comprises directing to a device that is configured to perform stream encryption.

15. A method of implementing a communication security architecture that divides communication functions into (1) a Service Negotiation Plane for communications associated with service negotiations and (2) a data plane for communications associated with transmission of user data, the method comprising:
at a trusted switch:
connecting to a local platform including one or more local networks;
receiving a request from a remote device that is connected to a remote platform including one or more remote networks over a data link via the Service Negotiation Plane, the request being a request for transmitting user data using one of the one or more local networks;
retrieving one or more service rules associated with the one or more local networks generated by one or more local managers of the one or more local networks, wherein each of the one or more local networks has a local manager configured to (1) manage a plurality of communication functions of a corresponding local network among the one or more local networks and (2) establish one or more service rules associated with the corresponding local network;
based on the one or more service rules, determining whether the user data is permitted to be transmitted using any one of the one or more local networks of the local platform; and
in response to determining that the user data from the remote device is permitted to be transmitted using a particular one of the one or more local networks, opening the data plane of the data link, allowing the user data to pass through the data link via the data plane;
receiving the user data from the remote device over the data link via the data plane;
directing the user data to one or more encryption devices, encrypting the user data by the one or more encryption devices based on the one or more service rules; and
transmitting the encrypted user data to a particular local network of the local platform via the data plane.

16. The method of claim 15, wherein determining whether the user data is permitted to be transmitted using any one of the one or more local networks of the local platform comprises causing a data guard that belongs to one of the local networks to determine whether a message is a particular type of message that is allowed to pass through.

17. The method of claim 15, further comprising causing a data guard that belongs to the Service Negotiation Plane to label a message as a service negotiation message.

18. The method of claim 15, further comprising causing a data guard that belongs to the Service Negotiation Plane to label a message as a message that can be delivered to one of the one or more local networks.

19. The method of claim 15, wherein directing the user data to the one or more encryption devices, encrypting the user data by the one or more encryption device comprises directing to a device that is configured to perform stream encryption.

20. The method of claim 15, wherein directing the user data to the one or more encryption devices, encrypting the user data by the one or more encryption device comprises selecting between a first encryption device that is configured to perform stream encryption and a second encryption device that is configured to perform block encryption.

* * * * *